United States Patent Office 3,328,491
Patented June 27, 1967

3,328,491
UV LIGHT ABSORBING COPOLYMERS OF ACRYL-OXYMETHYL BENZOATES AND DIHYDROXY-BENZOPHENONE DERIVATIVES
Joseph Fertig, New York, N.Y., Albert I. Goldberg, Englefield Green, Surrey, England, and Martin Skoultchi, Somerset, N.J., assignors to National Starch and Chemical Corporation, New York, N.Y., a corporation of Delaware
No Drawing. Filed May 1, 1964, Ser. No. 364,322
The portion of the term of the patent subsequent to Dec. 22, 1981, has been disclaimed
7 Claims. (Cl. 260—901)

ABSTRACT OF THE DISCLOSURE

Polymeric light absorbers comprising copolymers derived from: (1) phenyl 2-hydroxy-5-acryloxymethylbenzoate or phenyl 2-hydroxy-5-methacryloxymethylbenzoate and (2) 2-hydroxy-4-(2-hydroxy-3-acryloxypropyl) benzophenone or 2 - hydroxy-4-(2-hydroxy-3-methacryl-oxypropyl)benzophenone. Compositions comprising polymeric synthetic plastics intimately admixed with at least 0.5%, by weight, of the aforesaid copolymers.

---

This invention relates to novel compositions of matter for use in the stabilization of synthetic plastics. More particularly, this invention relates to the preparation of novel polymeric compositions capable of absorbing ultra-violet radiation.

It is the prime object of this invention to provide novel polymeric materials for use as light absorbers for the stabilization of synthetic plastics. It is a further object of this invention to prepare polymeric compositions capable of absorbing ultra-violet radiation over an unusually broad region of the ultra-violet spectrum. A still further object of this invention involves the preparation of polymeric light absorbers which display a high degree of compatibility with a wide variety of synthetic plastics. Various other objects and advantages of this invention will become apparent upon a reading of the following disclosure.

As is well known in the art, many synthetic plastics are subject to physical degradation and/or discoloration as a result of prolonged exposure to sunlight. These deleterious effects are due, for the most part, to the ultra-violet radiation emanating from the sun and particularly the ultra-violet radiation in the range of about 300–400 millimicrons. In order to reduce or entirely eliminate these effects of ultra-violet radiation, it is necessary to formulate plastics with materials which are capable of absorbing this radiation and thereby convert it into an energy form which is devoid of degradative effects.

Materials which function in this manner are commonly referred to as light absorbers. Thus, although several types of organic compounds, and particularly derivatives of benzophenone and of salicylic acid, have been utilized as light absorbers, these useful products are all ordinarily characterized by one feature which they have in common with one another. This commonly shared characteristic relates to the fact that they possess aromatic nuclei having one or more hydroxyl and carbonyl groups which are substituted ortho to one another. The latter configuration is apparently required for the successful performance of a light absorber inasmuch as it undergoes hydrogen bonding, thereby forming a six membered chelate ring having exceedingly high resonance stability and increased ultra-violet absorptive properties.

In practice, most light absorbers are physically blended, as extraneous additives, with the plastics which they are to protect prior to the extrusion, molding, casting, calendering or other type of forming operation to which said plastic is to be subjected. The resulting product is thus a heterogeneous mixture and, as might be expected, the components of such mixtures frequently display rather poor compatibility towards one another resulting from the fact that the plastic is, of course, a high molecular weight polymer whereas the light absorber is an organic compound having a molecular weight which is only a small fraction of that of the polymer. This poor compatibility often manifests itself in a gradual loss or removal of some or all of the light absorber from within the mass of the plastic. This loss may occur in the form of a bleeding or migration of the light absorber onto the surface of the plastic or it may take place by means of a volatilization process. Moreover, in those cases where the light absorber is either water or organic solvent soluble, leaching may occur in the event of any accidental or unavoidable contact of the formulated plastic with the requisite deleterious solvent medium. In any event, as a result of the loss of light absorber, the plastic will of course again be susceptible to the degradative effects of ultra-violet radiation.

Still another problem inherent in the use of light absorbers for the stabilization of synthetic plastics relates to the fact that these materials are often quite limited with respect to the range within which they are capable of absorbing ultra-violet radiation. Thus, as noted earlier, certain derivatives of salicylic acid and of benzophenone are frequently employed as light absorbers. Particularly useful are phenyl salicylate and 2,4-dihydroxybenzophenone. In the case of phenyl salicylate, its maximum or most efficient ultra-violet absorption spectrum is in the range of about 310 millimicrons and it does not absorb very well in the region below 290 or in the region above 320 millimicrons. On the other hand, 2,4-dihydroxybenzophenone has maximum absorption spectra at both 288 and 325 millimicrons. Thus, since many plastics are susceptible to ultra-violet radiation over a rather broad range, the use of any one particular light absorber will often not afford complete protection inasmuch as there will still be one or possibly two broad areas, one being above the maximum absorption wave length and the other being below the minimum absorption wave length of the selected light absorber, wherein the plastic may still be attacked.

In a copending application, Ser. No. 150,154, filed Nov. 6, 1961, now Patent No. 3,141,903, there are disclosed novel compositions of matter comprising ethylenically unsaturated derivatives of phenyl salicylate such as phenyl 2-hydroxy-5-acryloxymethyl benzoate and phenyl 2-hydroxy-5-methacryloxymethyl benzoate. The latter compounds possess the unusual combination of being effective light absorbers as well as being vinyl monomers. Thus, when these compounds are polymerized with conventional vinyl monomers such, for example, as vinylidene chloride, vinyl chloride, vinyl acetate, or ethyl acrylate, etc., the resulting copolymers are characterized by their integral or "built-in" resistance to ultra-violet radiation which results from the presence therein, as part of the polymer backbone, of the moieties derived from these ethylenically unsaturated phenyl salicylate derivatives. Such novel copolymers, which are effectively stabilized without the need for their being blended with any extraneous light absorbers, comprise the subject of copending application Ser. No. 150,197, which was filed on Nov. 6, 1961 now Patent No. 3,186,968.

In still another copending application, Ser. No. 202,983, filed June 18, 1962, now Patent No. 3,162,676, there are described novel compositions of matter comprising ethylenically unsaturated derivatives of 2,4-dihydroxybenzophenone such as the 4-acryloxy and the 4-methacryloxy beta-hydroxypropyl ethers of 2,4-dihydroxybenzophenone; which latter compounds will be hereinafter referred to, respectively, as 2-hydroxy-4-(2-hydroxy-3-acryloxypropyl)benzophenone and 2-hydroxy-4-(2-hydroxy-3-methacryloxypropyl)benzophenone. Here again, the latter compounds possess the unusual combination of being effective light absorbers as well as being vinyl monomers. Thus, as was the case with the above described phenyl salicylate derivatives, when these compounds are polymerized with conventional vinyl monomers, the resulting copolymers are characterized by their integral or "built-in" resistance to ultra-violet radiation which results from the presence therein, as part of the polymer backbone, of the moieties derived from these ethylenically unsaturated benzophenone derivatives. Such novel copolymers, which are thus effectively stabilized without the need for their being physically blended with any extraneous light absorbers, comprise the subject of copending application, Ser. No. 213,577, which was filed on July 31, 1962, now Patent No. 3,173,893.

Although the novel copolymers derived, respectively, from the above described ethylenically unsaturated derivatives of phenyl salicylate and of 2,4-dihydroxybenzophenone display resistance to ultra-violet radiation without any of the compatibility problems resulting from the use of extraneous light absorbers, the degree of protection which is available to these copolymers is still somewhat limited inasmuch as the ultra-violet absorption spectrum of these copolymers is necessarily limited to the absorption band of the individual phenyl salicylate or 2,4-dihydroxybenzophenone derivative whose moieties are present within the copolymer. Thus, there is still seen to be a need for light absorbers which are capable of providing protection over a broader region of the ultra-violet spectrum than is made possible by the use of any of the presently available light absorbers.

We have now discovered a novel class of light absorbers which are capable of absorbing ultra-violet radiation over an unusually broad region of the ultra-violet spectrum and whose use in the form of extraneous additives is, moreover, devoid of any of the compatibility problems normally associated with the use of the extraneous light absorbers of the prior art.

In brief, the novel compositions of this invention are the polymers resulting from the copolymerization of the above described ethylenically unsaturated derivatives of phenyl salicylate with the above described ethylenically unsaturated derivatives of 2,4-dihydroxybenzophenone. Thus, our polymeric light absorbers comprise copolymers of: (A) at least one monomer corresponding to the formula:

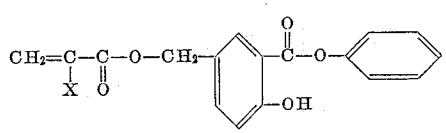

wherein X represents a radical selected from the group consisting of hydrogen, i.e. —H, and methyl, i.e. —CH$_3$, radicals; together with: (B) at least one monomer corresponding to the formula:

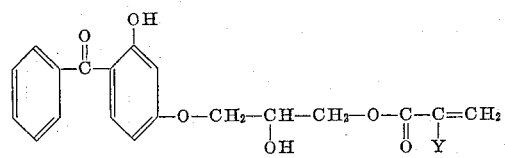

wherein Y represents a radical selected from the group consisting of hydrogen and methyl radicals.

Thus, it is to be seen that our novel light absorbers are copolymers of: (A) at least one ethylenically unsaturated derivative of phenyl salicylate selected from the group consisting of phenyl 2-hydroxy-5-acryloxymethyl benzoate and phenyl 2-hydroxy-5-methacryloxymethyl benzoate; together with (B) at least one ethylenically unsaturated derivative of 2,4-dihydroxybenzophenone selected from the group consisting of 2-hydroxy-4-(2-hydroxy-3-acryloxypropyl)benzophenone and 2-hydroxy-4-(2-hydroxy-3-methacryloxypropyl)benzophenone.

The above listed monomeric phenyl salicylate derivatives may be readily prepared by means of the procedures described in the above noted copending application, Ser. No. 150,154, while the above listed monomeric 2,4-dihydroxybenzophenone derivatives may be readily prepared by means of the procedures described in the above noted copending application, Ser. No. 202,983.

As for the actual preparation of the novel light absorbing copolymers of this invention, there may be employed any of the usual vinyl polymerization methods which are well known to those skilled in the art. Thus, they may be prepared by means of free radical initiated processes utilizing bulk, suspension, solution or emulsion polymerization techniques as will subsequently be demonstrated in the experimental examples presented as part of this specification.

In any event, regardless of the polymerization procedure utilized in their preparation, the resulting copolymers are all characterized by the fact that they comprise polymeric light absorbers which are capable of effectively absorbing ultra-violet radiation over an unusually broad region of the ultra-violet spectrum. This wide absorption band is made possible by the fact that these copolymers contain moieties derived from both phenyl salicylate and 2,4-dihydroxybenzophenone.

In order, however, to make certain that our copolymers are fully capable of absorbing ultra-violet radiation over this unusually broad region of the ultra-violet spectrum, it is desirable that they contain at least 0.5%, by weight of the polymer, of moieties derived from one or more monomers selected from the above listed group of ethylenically unsaturated phenyl salicylate derivatives and a similar minimum concentration, i.e at least 0.5%, of moieties derived from one or more monomers selected from the above listed group of ethylenically unsaturated derivatives of 2,4-dihydroxybenzophenone.

Our novel copolymers may be utilized as light absorbers in the form of extraneous additives which may be physically blended with any of a wide variety of synthetic resins. They are, thus, useful for the stabilization of such materials as the homo- and copolymers derived, respectively, from styrene, vinyl chloride, vinylidene chloride, ethylene, propylene, acrylonitrile, vinyl acetate and methyl methacrylate etc. as well as the unsaturated polyesters having ethylenic unsaturation resulting from the presence of alpha, beta-unsaturated carboxylic acids, such as maleic and fumaric acid, and which are typically formulated with monomeric styrene or methyl methacrylate. In addition, one may also utilize our copolymers for the protection of various cellulosic resins such as ethyl cellulose, cellulose acetate and cellulose butyrate, etc. as well as such other types of resins as polyamides, polyurethanes, polycarbonates and epoxies. In order to protect most synthetic resins from ultra-violet radiation, our novel copolymers should be introduced in a concentration of about 0.5 to 5.0%, by weight of said resin.

Our copolymers may be formulated with any of the above listed resins prior to the extrusion, molding casting, calendering or other type of forming operation to which the resin is to be subjected. The resulting compositions, although they are heterogeneous mixtures, are nonetheless essentially devoid of the compatibility problems which are normally associated with the use of extraneous light absorbers which are low molecular weight organic compounds. Thus, these plastic compositions retain their light stability over prolonged periods without any possible loss of light absorber resulting from surface migration, volatilization or solvent leaching.

Another approach relating to the use of our novel light absorbing copolymers, involves the coating of films, or the lamination of free films, derived from our copolymers onto various plastic substrates. The films derived from our copolymers thereby serve to protect said substrates from the effects of ultra-violet radiation.

Still another aspect of the novel process of our invention relates to the fact that it is possible to introduce one or more conventional vinyl comonomers into the monomer mixture utilized for the preparation of our novel copolymers. Thus, the resulting copolymers would be derived from one or more of the ethylenically unsaturated phenyl salicylate derivatives, one or more of the ethylenically unsaturated 2,4-dihydroxybenzophenone derivatives, along with one or more conventional vinyl comonomers. Such copolymers should still, preferably, contain at least about 0.5%, by weight, of moieties derived from each of the above listed groups of ethylenically unsaturated derivatives of phenyl salicylate and 2,4-dihydroxybenzophenone since, as noted earlier, the presence of this minimum concentration of moieties from each of these two groups of derivatives is desirable in order to provide these copolymers with the ability to absorb ultra-violet radiation over an unusually broad region of the ultra-violet spectrum.

Copolymers of this type may thus contain as much as 99.0%, by weight of one or more conventional vinyl, i.e. ethylenically unsaturated, monomers such for example as styrene; alpha-methyl styrene; the acrylic and methacrylic acid esters of aliphatic alcohols such as methyl, ethyl, propyl, butyl, isobutyl, amyl, hexyl, 2-ethyl hexyl, octyl, lauryl, and stearyl alcohols; acrylic acid; isoprene; butadiene; methacrylic acid; acrylamide; acrylonitrile; methacrylonitrile; vinyl propionate; dibutyl maleate; dibutyl fumarate; vinylidene chloride; vinyl chloride; vinyl acetate; ethylene; and, propylene, etc.

Despite the fact that these copolymers may contain as much as 99.0% of one or more of the above listed conventional vinyl monomers, they are nevertheless characterized by their integral or "built-in" light stability over an unusually broad region of the ultra-violet spectrum resulting from the fact that they contain, as part of their polymeric backbone, moieties of both phenyl salicylate and 2,4-dihydroxybenzophenone. This improved stability is, in fact, superior to the results obtained when extraneous ultra-violet light absorbers are physically blended with the comparable polymers which do not contain this combination of moieties from the ethylenically unsaturated derivatives of phenyl salicylate and 2,4-dihydroxybenzophenone. Moreover, all of the previously described compatibility problems which are inherent in the use of such extraneous light absorbers are avoided with these homogeneous copolymers.

In utilizing these copolymers which are derived from one or more conventional vinyl monomers in addition to the combination of ethylenically unsaturated derivatives of phenyl salicylate and 2,4-dihydroxybenzophenone, they may be directly fabricated into such forms as coatings, films, sheeting, and other solid shapes which may then be further converted into industrial and consumer articles. The precise application which is selected for these copolymers will, of course, be dictated by their specific composition. Thus, for example, if the copolymer contained a high percentage of styrene it could be used in any of the applications in which polystyrene is normally employed. Moreover, as was the case with those copolymers of our invention which contain only the combination of moieties derived from phenyl salicylate and 2,4-dihydroxybenzophenone, these copolymers containing one or more conventional vinyl comonomers may also be employed as extraneous additives by being physically blended with a synthetic resin. In addition, cast films, or laminations of free films, derived from these copolymers may be applied to various polymeric substrates, such films thereby serving to protect said substrates from the effects of ultra-violet radiation.

The above disclosure has been limited to the preparation of light absorbing copolymers of: (A) at least one ethylenically unsaturated derivative of phenyl salicylate selected from the group consisting of phenyl 2-hydroxy-5-acryloxymethylbenzoate and phenyl 2 - hydroxy - 5 - methacryloxymethyl benzoate; together with: (B) at least one ethylenically unsaturated derivative of 2,4-dihydroxybenzophenone selected from the group consisting of 2-hydroxy-4-(2-hydroxy - 3 - acryloxypropyl)benzophenone and 2 - hydroxy-4-(2-hydroxy-3-methacryloxypropyl)benzophenone. However, it is to be noted at this point that comparable light absorbing copolymers may also be prepared wherein the following compounds may be substituted for the above given phenyl salicylate derivatives:

phenyl 2-hydroxy-4-acryloxy benzoate,
phenyl 2-hydroxy-5-acryloxy benzoate,
phenyl 2-hydroxy-4-methacryloxy benzoate, and
phenyl 2-hydroxy-5-methacryloxy benzoate.

Procedures for the preparation of the above listed derivatives are described in the above noted copending application, Ser. No. 150,154. Moreover, as substitutes for the above given 2,4-dihydroxybenzophenone derivatives, one may employ the following compounds:

2,2'-dihydroxy - 4 - (2-hydroxy-3-acryloxypropyl)benzophenone,
2,2'-dihydroxy - 4 - (2-hydroxy-3-methacryloxypropyl)-benzophenone,
2,2'-dihydroxy-4,4'-di(2-hydroxy - 3 - acryloxypropyl)-benzophenone, and
2,2'-dihydroxy - 4,4' - di(2 - hydroxy-3-methacryloxypropyl)benzophenone.

Preparative procedures for the latter compounds are given in the above noted copending application, Ser. No. 202,983. Additional substitutes for the above listed 2,4-dihydroxybenzophenone compounds are:

2-hydroxy-4-(2-hydroxybutenyl-1)benzophenone,
2,2'-dihydroxy-4-(2 - hydroxybutenyl - 1)benzophenone,
2,2'-dihydroxy-4,4'-di(2 - hydroxybutenyl - 1) benzophenone,
2 - hydroxy - 4 - (2-hydroxy-3-allyloxypropyl)benzophenone,
2,2'-dihydroxy-4-(2-hydroxy - 3 - allyloxypropyl)benzophenone, and
2,2'-dihydroxy - 4,4' - di(2-hydroxy-3-allyloxypropyl)-benzophenone.

Preparative procedures for the latter compounds are given in copending application, Ser. No. 202,984, filed June 18, 1962 and now abandoned.

The following examples will further illustrate the embodiment of our invention. In these examples, all parts given are by weight unless otherwise noted.

EXAMPLE I

This example illustrates the preparation of one of the novel copolymers of our invention by means of a solution polymerization technique and also demonstrates the resistance towards the degradative effects of ultra-violet radiations which the resulting copolymer imparts to a conventional polymer upon being blended therewith.

An acetone lacquer of a copolymer containing equal parts of moieties derived from phenyl 2-hydroxy-5-methacryloxymethyl benzoate and 2-hydroxy-4-(2-hydroxy - 3 - methacryloxypropyl)benzophenone was prepared by charging the following ingredients into a reactor equipped with a reflux condenser as well as with means for mechanical agitation:

| | Parts |
|---|---|
| Phenyl 2-hydroxy-5-methacryloxymethyl benzoate | 12.5 |
| 2-hydroxy-4-(2-hydroxy-3-methacryloxypropyl)-benzophenone | 12.5 |
| Acetone | 75.0 |
| Benzoyl peroxide | 0.125 |

Under agitation, the above mixture was refluxed at 56° C. for a period of eight hours whereupon it was allowed to cool and discharged from the reactor. The resulting lacquer had a resin solids content of 25%, by weight, indicating a conversion of 100% and it was found to yield hard, brittle films. The copolymer had an intrinsic viscosity of 0.15 as determined, in tetrahydrofuran, at 30° C.

The copolymer was precipitated from the above described lacquer by the addition, thereto, of methanol. The 17 parts of copolymer solids thus obtained were then redissolved in tetrahydrofuran and the resulting solution thereupon blended with a tetrahydrofuran solution containing 30%, by weight of solids, of a 90:10 vinyl chloride:ethyl acrylate copolymer so as to yield a solution containing 1%, by weight, of our novel copolymer as based on the total weight of the latter vinyl chloride:ethyl acrylate copolymer which was also present therein.

A film having a wet thickness of 6 mils was then cast from this solution onto the surface of a sheet of white paper. The resulting laminate was thereupon exposed for 140 hours, at a distance of 2 feet, from a General Electric UA 11B ultra-violet lamp. As a control for this test, a similarly coated sheet was exposed to the ultra-violet lamp under the identical conditions; however, the coating of this control sheet was derived from a sample of the above described tetrahydrofuran lacquer of a 90:10 vinyl chloride:ethyl acrylate copolymer which, in this case, had not been admixed with any of our novel ultra-violet stabilizing copolymer.

The effect of the ultra-violet source upon these resin coated films was determined, with respect to any color change which had occurred, by utilizing a Photovolt Reflectometer, Model 610. The latter device records proportionately higher readings with the increased yellowing, or other discoloration, of the particular coatings being evaluated.

The following table presents the results of these tests. In this table, the reflectometer readings which are given represent the difference between the readings obtained from the freshly prepared coatings as against the readings obtained subsequent to their exposure to the ultra-violet light source. Thus, a higher degree of discoloration will, of course, be indicated by a higher reading of the reflectometer.

Coating resin: Reflectometer reading
   Control: vinylchloride:ethyl acrylate copolymer 5.5
   Mixture of vinyl chloride:ethyl acrylate copolymer with 1%, by weight, of the ultra-violet stabilizing copolymer _____ 3.5

The above data clearly serves to indicate how the use of our novel copolymers protects conventional polymers from the degradative effects of ultra-violet radiation.

EXAMPLE II

This example illustrates the preparation of another of the novel copolymers of our invention by means of a solution polymerization technique and again demonstrates the resistance towards the degradative effects of ultra-violet radiation which the resulting copolymer imparts to a conventional polymer blended therewith.

An acetone lacquer of a copolymer containing equal parts of moieties derived from phenyl 2-hydroxy-5-acryloxymethyl benzoate and 2-hydroxy-4-(2-hydroxy-3-acryloxypropyl)benzophenone was prepared by following the procedure described in Example I, hereinabove. The resulting lacquer had a resin solids content of 25%, by weight, indicating a conversion of 100% and it yielded hard, brittle films. The copolymer had an intrinsic viscosity of 0.12 as determined, in tetrahydrofuran, at 30° C.

This copolymer was then precipitated from the above described lacquer by the addition, thereto, of methanol. The 21 parts of copolymer solids thus obtained were then redissolved in tetrahydrofuran and the resulting solution thereupon blended with a toluene solution containing 30%, by weight of solids, of a polystyrene homopolymer so as to yield a solution containing 1%, by weight, of our novel copolymer as based on the total weight of the polystyrene which was present therein.

A film having a wet thickness of 6 mils was cast from this solution onto the suprface of a glass plate. After drying, this film was then stripped from the glass plate and a representative sample was used to determine the intrinsic viscosity of the mixture of polystyrene with our ultra-violet stabilizing copolymer; the latter determination being conducted, in toluene, at a temperature of 30° C. The remaining portion of this film was then exposed for 24 hours, at a distance of 2 feet, from a General Electric UA 11B ultra-violet lamp.

The intrinsic viscosity of the thus exposed film was thereupon determined in order to evaluate its resistance to the effects of ultra-violet radiation. Thus, any degradation resulting from ultra-violet radiation would be indicated by a drop in the intrinsic viscosity of the mixture of polystyrene with our ultra-violet stabilizing copolymer, with the extent of the drop being proportional to the amount of degradation which had taken place.

As a control for this test, a film derived from a sample of the identical polystyrene homopolymer lacquer which had been utilized in preparing the above described mixture was similarly exposed with the intrinsic viscosity of this film being determined both before and after its exposure to the ultra-violet light source. The results of these tests are presented in the following table.

| Film Sample | Initial Intrinsic Viscosity | Intrinsic Viscosity After Exposure to Ultra-Violet Source |
|---|---|---|
| Mixture of polystyrene and 1%, by weight, of the ultra-violet stabilizing copolymer | 1.0 | 0.92 |
| Control: polystyrene homopolymer | 0.9 | 0.6 |

The above data clearly indicate the remarkable degree of resistance to ultra-violet radiation which is achieved in conventional polymers when they are blended with the novel copolymers of our invention.

EXAMPLE III

Following the procedure described in Example I, hereinabove, the acetone lacquer of the following copolymers were prepared:

(1) a 50:50 phenyl 2-hydroxy-5-acryloxymethyl benzoate:2-hydroxy-4-(2-hydroxy-3-methacryloxypropyl)benzophenone copolymer; and, (2) a 50:50 phenyl 2-hydroxy-5-methacryloxymethyl benzoate:2-hydroxy-4-(2-hydroxy-3-acryloxypropyl)benzophenone copolymer.

Each of the latter copolymers was found to impart outstanding resistance to the degradative effects of ultra-violet radiation when blended with conventional polymeric materials.

Summarizing, this invention is thus seen to provide the practitioner with novel copolymers to be utilized as light absorbers for the protection of synthetic plastics against the degradative effects of ultra-violet radiation. Variations may be made in procedures, proportions and ma-

What is claimed is:

1. A novel polymeric light absorber comprising a copolymer of: (A) at least one monomer corresponding to the formula:

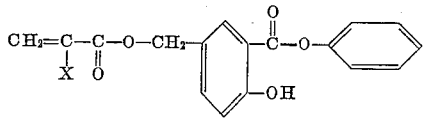

wherein X represents a radical selected from the group consisting of hydrogen and methyl radicals; and, (B) at least one monomer corresponding to the formula:

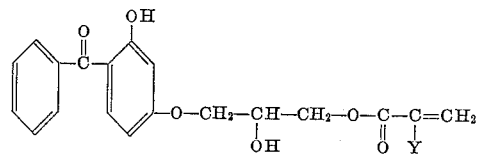

wherein Y represents a radical selected from the group consisting of hydrogen and methyl radicals.

2. A novel polymeric light absorber comprising a copolymer of: (A) at least one ethylenically unsaturated derivative of phenyl salicylate selected from the group consisting of phenyl 2-hydroxy-5-acryloxymethyl benzoate and phenyl 2-hydroxy-5-methacryloxymethyl benzoate; and (B) at least one ethylenically unsaturated derivative of 2,4-dihydroxybenzophenone selected from the group consisting of 2-hydrovx-3-acryloxypropyl)benzophenone and 2-hydroxy-4-(2-hydroxy-3-methacryloxypropyl)benzophenone.

3. A copolymer of phenyl 2 - hydroxy - 5 - acryloxymethyl benzoate and 2-hydroxy-4-(2-hydroxy - 3 - arcyloxypropyl)benzophenone.

4. A copolymer of phenvy 2-hydroxy-5-methacryloxymethyl benzoate and 2 - hydroxy - 4 - (2 - hydroxy-3-acryloxypropyl)benzophenone.

5. A copolymer of phenyl 2 - hydroxy - 5 - acryloxymethyl benzoate and 2 - hydroxy - 4 - (2 - hydroxy - 3-methacryloxypropyl)benzophenone.

6. A copolymer of phenyl 2 - hydroxy - 5 - methacryloxymethyl benzoate and 2 - hydroxy - 4 - (2 - hydroxy-3-methacryloxypropyl)benzophenone.

7. A composition of matter comprising a polymeric synthetic plastic having intimately admixed therewith as an ultra-violet light absorber at least 0.5%, by weight, of said synthetic plastic of a copolymer of: (A) at least one ethylenically unsaturated derivative of phenyl salicylate selected from the group consisting of phenyl 2-hydroxy-5-acryloxymethyl benzoate and phenyl 2-hydroxy-5-methacryloxymethyl benzoate; and (B) at least one ethylenically unsaturated derivative of 2,4-dihydroxybenzophenone selected from the group consisting of 2-hydroxy-4 - (2-hydroxy-3-acryloxypropyl)benzophenone and 2 - hydroxy - 4 - (2 - hydroxy - 3 - methacryloxypropyl)benzophenone.

References Cited

UNITED STATES PATENTS 3,162,676   12/1964   Goldberg et al. _____ 260—486
3,186,968   6/1965   Fertig et al. _____ 260—47

WILLIAM H. SHORT, *Primary Examiner.*

M. GOLDSTEIN, *Assistant Examiner.*